United States Patent [19]

Postle et al.

[11] 4,444,939

[45] Apr. 24, 1984

[54] PHOTOCHROMIC PAINT

[75] Inventors: Stephen R. Postle, Brentwood; Samuel B. Kingston, Doddinghurst, both of England

[73] Assignee: Ciba-Geigy AG, Basel, Switzerland

[21] Appl. No.: 471,553

[22] Filed: Mar. 2, 1983

[30] Foreign Application Priority Data

Mar. 11, 1982 [GB] United Kingdom ............... 8207064

[51] Int. Cl.$^3$ ................................................ C08K 3/40
[52] U.S. Cl. ................................. 524/494; 428/325; 524/492
[58] Field of Search ............... 523/172, 217; 524/492, 524/494, 521, 522, 556, 547, 817, 852; 428/325

[56] References Cited

FOREIGN PATENT DOCUMENTS 1213543  5/1967  United Kingdom .
1227201  2/1968  United Kingdom .

*Primary Examiner*—Joseph L. Schofer
*Assistant Examiner*—Judy M. Reddick
*Attorney, Agent, or Firm*—Joseph G. Kolodny

[57] ABSTRACT

Photochromic paint comprising a latex of an acrylate and/or a methacrylate polymer, the polymer particles of which constitutes 30 to 50% by weight of the latex and which has been prepared using a copolymerizable surfactant, there being dispersed in the latex photochromic glass beads of from 0.05 to 1.00 μm in size and which comprises from 10 to 30% by weight of the latex, the total solids content of the latex being from 40 to 60% by weight. The paint may be coated on to any surface which will accept a water-based paint.

7 Claims, No Drawings

PHOTOCHROMIC PAINT

This invention relates to photochromic material.

The most common photochromic material is photochromic glass sheets and this material has found many uses. However, photochromic glass sheets can not be used for many purposes where it would be desirable to use a photochromic material because it is either not flexible enough or is liable to be damaged.

We have found a photochromic paint which can be applied to any surface which can accept a water-based paint. This paint can be used in circumstances in which the use of photochromic glass sheets would either be too expensive or unacceptable.

According to the present invention there is provided photochromic paint which comprises a latex of an acrylate and/or a methacrylate polymer, the polymer particles of which constitute 30 to 50% by weight of the latex and which has been prepared using a copolymerisable surfactant, there being dispersed in the latex photochromic glass beads of from 0.05 to 1.00 μm in size and which comprises from 10 to 30% by weight of the latex, the total solids content of the latex being from 40 to 60% by weight.

Another object of the present invention is the article which is painted with the inventive photochromic paint.

The preferred total solids content of the latex is 45 to 55% by weight.

The preferred ratio of polymer particles to photochromic glass beads is from 3:1 for transparent materials to 2:1 for an opaque material by weight.

By acrylate or methacrylate copolymer is meant a copolymer which comprises at least 20% by weight of acrylate or methacrylate units.

A particularly suitable copolymer of this type is a copolymer of an alkyl acrylate and styrene which comprises from 20 to 40% by weight of the acrylate and 60 to 80% by weight of the styrene. Butyl acrylate is an especially suitable monomer from which to prepare this class of copolymers.

Examples of other suitable acrylate and methacrylate monomers for use in the paint are methyl acrylate, methyl methacrylate, butyl methacrylate and 2-ethylhexyl acrylate.

Where the monomer mixture contains other ethylenically unsaturated monomers, then those monomers may be selected from for example styrene, acrylonitrile, vinylidene chloride or vinyl acetate. Suitable comonomers are hydroxyethyl acrylate, hydroxyethyl methacrylate and, hydroxypropyl methacrylate. preferably if co-monomers such as acrylic acid, methacrylic acid or other polymerisable acids are used, their proportion of the total monomer contents should not exceed 5%, otherwise a substantial increase in particle size is observed and this affects the photochromaticity of the paint.

Another suitable monomer is a so-called copolymerisable surfactant such as alkali metal salts of vinyl, allyl, acrylyl or styryl sulphonates.

Preferably from 1 to 5% by weight of the latex polymer is derived from the copolymerisable surfactant.

Preferably there is present in the paint a so-called coalescing agent. Coalescing agent help to spread a coated paint film and help to prevent the surface assuming a "crazed" appearance. Examples of substances which can be used as coalescing agents are glycol ethers, tricresyl phosphate, di-butyl phthalate and hydroxyalkyl isobutyrates (Texanol, Trademark).

The use of coalescing agents in latex paints is described for example in "Emulsions and Emulsion Technology" Part 1, published by Marcel Dekker Inc. in 1974, on page 374.

The photochromic paint of the present invention may be prepared by forming an acrylate or methacrylate polymer latex having the required solids content and stirring in the requisite amount of photochromic glass beads, preferably in the presence of a coalescing agent.

The preferred redox initiator system for use in the preparation of the latex is the sodium or potassium persulphate/sodium metabisulphite system. Most preferably the monomers and the metabisulphite are emulsified with some of the surfactant, then added dropwise to the reaction vessel which is maintained preferably at between 70° and 90° C., and contains persulphate and the remainder of the surfactant.

Optionally a chain transfer reagent, for example isopropanol, may be present either in the pre-emulsified monomer mixture or present in the reaction vessel initially.

The glass beads preferably contain as the photochromic system a metal halide and especially silver halide. The glass beads may be prepared by grinding up photochromic glass sheets of the type described for example in U.S. Pat. No. 3,208,860 and GB Nos. 1,111,977; 1,410,203; 1,428,736; 1,498,769; 1,505,100 and 1,518,497.

The photochromic paint of the present invention may be coated on to any surface which will accept a water-based paint. For example, it may be coated on to plastics material or paper sheets, metal foil or flat metal surfaces, wooden surfaces and flat plastics material surfaces.

The photochromic paint of the present invention may when applied as a coating exhibit slow photochemical reversal allowing non-destructive read-out at wavelengths below 600 nm.

When the proportion of photochromic material present in the binder paint layer is from 10 to 20% by weight of the dried polymer the layer is light transparent. When however, the proportion of photochromic material is from 20 to 40% and especially from 30 to 40% by weight the layer is opaque.

Possible uses of a dried layer of the paint of the invention are as follows:

(1) for an opaque or semi-opaque assembly:

temporary reusable print material for use in microplanning, microfilm copying, graphic arts material where the copy can be examined and information extracted. A permanent copy then can be made in a normal photographic way from a negative, or the temporary print may be copied e.g. xerographically;

(2) for a transparent or translucent assembly:

window covering especially with adhesive or electrostatic backing, for office and domestic windows, car windscreens, spectacle coverings, greenhouses, to control ultra-violet (u.v.)-radiation and glare when coated on transparent sheet material;

masking material to enhance print contrast when used as in U.S. Pat. No. 4,021,191 or as in Phot. Sci. Eng. 1965, Vol. 9, 67–71 or by carrying a preformed and semi-stable image, as a contrast reducing aid in a positive-positive print system for example, a silver dye bleach system;

reversable microfilm or similar film, for recording CRO (cathode ray oscilloscope) output or COM (computer output material) where permanent storage of such output may not be vital: a copy of the data stored on the temporary film would then be available for permanent copying onto another film when coated on transparent sheet material.

The following example will serve to illustrate the invention.

EXAMPLE

Preparation of Photochromic Glass Particles 32 g of lump of photochromic glass containing silver bromide as the photochromic system, (prepared according to GB No. 111,977) is dry ground in a pestle and mortar, until the majority can be sieved through a 2 mm mesh. In this way 30 g of the glass powder is sieved into a 250 ml stainless steel pot which is filled to 75% of its volume with 10 mm stainless steel balls, sealed, and rolled on a roller mill for 10 hours. The powdered glass is then washed off the balls with 60 ml of water which contains an alkyl naphthalene sodium sulphonate wetting agent at 0.1% concentration. Further water is added to give a total dispersion of 100 g. This is milled in a bead mill (Dyno Mill: Glen Creston) using 1.0–1.5 mm glass beads at a rate of 3000 r.p.m. for 2 hours. This gives a dispersion of a mean particle size 2, and a polydispersity of 4 (as measured on a Nanosizer: Coulter Instruments) and containing 30% solids.

Polymerisation Procedure

The reaction vessel is charged with 358 ml of water, 0.4 g of sodium metabisulphite, 0.8 g of sodium persulphate and 28 ml of a short chain vinyl sulphonate (COPS I, trademark).

The system is purged with nitrogen for 15 minutes before stirring.

The monomers, remaining initiators and surfactant are pumped into the reaction vessel from three reservoirs:

| Reservoir A: | butyl acrylate | 80 ml |
| --- | --- | --- |
| | styrene | 80 ml |
| Reservoir B: | water | 158 ml |
| | short chain vinyl sulphonate | 28 ml |
| | sodium styrene sulphonate | 40 g |
| | sodium metabisulphite | 0.4 g |
| | hydroxyalkyl isobutyrate | 15 g |
| Reservoir C: | styrene | 200 ml |

The contents of reservoir A is pumped into the reaction vessel under nitrogen at 65° C., over one hour. The polymerisation is continued for 30 minutes before addition of 0.8 g of sodium persulphate. The contents of reservoir B and C are then pumped simultaneously over 30 minutes into the reaction vessel.

Polymerisation is contained for 3 hours at 75° C. The viscous latex is filtered through muslin and bottled.

Into 100 g of the latex is slowly stirred 23 g of a 65% solids milled photochromic aqueous disperson as prepared above.

The solids content of the prepared paints is 45% by weight of polymer and 15% by weight of photochromic glass beads.

To test the photochromic properties of the paint some of the paint is coated on a glass sheet and the coating is left to dry at 25° C. Another portion of paint is coated on another glass sheet and this sheet is dried in an oven at 50° C. On inspection of the two paint layers there is no observable difference.

The photochromaticity of the coated sheets is demonstrated by half covering each sheet with opaque material and exposing the whole of each sheet for 360 seconds to a 30 watt u.v.-lamp which is emitting light at 366 nm. In both cases the portion of the sheets not covered by the opaque material is noticeably darker than the remainder of the sheet. On leaving the two sheets under ambient daylight conditions, each sheet adopted a uniform density after 30 minutes. This demonstrates the reversability of the system.

We claim:

1. Photochromic paint which comprises a latex of an acrylate and/or a methacrylate polymer, the polymer particles of which constitute 30 to 50% by weight of the latex and which has been prepared using a copolymerisable alkali metal salt of a vinyl or styryl sulphonate there being dispersed in the latex photochromic glass beads of from 0.05 to 1.00 u m in size and which comprises from 10 to 30% by weight of the latex, the total solids content of the latex being 40 to 60% by weight.

2. Photochromic paint according to claim 1, wherein the total solids content of the latex is 45 to 55% by weight.

3. Photochromic paint according to claim 1, wherein the ratio of polymer particles to photochromic glass beads is from 3:1 to 2:1.

4. Photochromic paint according to claim 1, wherein the polymer of the latex is a copolymer which comprises 20 to 40% by weight of an alkyl acrylate and 60 to 80% by weight of styrene.

5. Photochromic paint according to claim 1, where from 1 to 5% by weight of the latex polymer is derived from the copolymerisable alkali metal salt of a vinyl or styryl sulphonate.

6. Photochromic paint according to claim 1, which also comprises glycol ethers, tricresyl phosphate, dibutyl phthalate and hydroxyalkyl isobutyrates.

7. An article paint with the photochromic paint according to claim 1.

* * * * *